US012673292B2

(12) United States Patent
Miyamoto et al.

(10) Patent No.: US 12,673,292 B2
(45) Date of Patent: Jul. 7, 2026

(54) CO₂ RECOVERY DEVICE

(71) Applicant: MITSUBISHI HEAVY INDUSTRIES, LTD., Tokyo (JP)

(72) Inventors: Osamu Miyamoto, Tokyo (JP); Kyohei Matsukawa, Tokyo (JP); Hiromitsu Nagayasu, Tokyo (JP); Satoru Sugita, Tokyo (JP); Daisuke Shimada, Houston, TX (US)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 328 days.

(21) Appl. No.: 18/359,293

(22) Filed: Jul. 26, 2023

(65) Prior Publication Data

US 2025/0032973 A1      Jan. 30, 2025

(51) Int. Cl.
    *B01D 53/14*      (2006.01)
    *B01D 53/18*      (2006.01)

(52) U.S. Cl.
    CPC ..... *B01D 53/1418* (2013.01); *B01D 53/1412* (2013.01); *B01D 53/1475* (2013.01); *B01D 53/18* (2013.01); *B01D 2257/504* (2013.01)

(58) Field of Classification Search
    CPC ........... B01D 53/1418; B01D 53/1412; B01D 53/1475; B01D 53/18; B01D 2257/504
    See application file for complete search history.

(56) References Cited

U.S. PATENT DOCUMENTS 4,198,386 A  *  4/1980  Laslo ..................... B01D 53/18
                                      261/23.1
6,138,378 A  10/2000  Takashina et al.
(Continued)

FOREIGN PATENT DOCUMENTS

CN        106017782 A  *  10/2016  ............. G01L 13/00
CN        109108001 A  *  1/2019  ........... B08B 9/0328
(Continued)

OTHER PUBLICATIONS

International Search Report issued in counterpart International Application No. PCT/JP2024/021748, dated Aug. 20, 2024 (8 pages).
(Continued)

*Primary Examiner* — Dung H Bui
(74) *Attorney, Agent, or Firm* — Osha Bergman Watanabe & Burton LLP

(57)        ABSTRACT

A CO₂ recovery device includes: a cooling tower into which an exhaust gas containing carbon dioxide is introduced to cool the exhaust gas; and an absorption tower into which the exhaust gas cooled in the cooling tower is introduced and which brings the exhaust gas into contact with an absorption liquid to remove the carbon dioxide from the exhaust gas, in which the absorption tower has an absorption tower body through which the exhaust gas is flowable and which has a tubular shape, and a demister that is disposed inside the absorption tower body and is configured to remove mist contained in the exhaust gas as the exhaust gas flows therethrough, and the CO₂ recovery device further comprises a flow velocity regulating section that regulates the flow velocity of the exhaust gas flowing through the demister to be within a predetermined range.

6 Claims, 7 Drawing Sheets

(56)     References Cited

U.S. PATENT DOCUMENTS

| | | | | | |
|---|---|---|---|---|---|
| 7,651,329 | B2* | 1/2010 | Okura | | F23J 15/08 |
| | | | | | 431/5 |
| 2003/0143129 | A1* | 7/2003 | Rabellino | | B01D 53/26 |
| | | | | | 422/177 |
| 2005/0132883 | A1* | 6/2005 | Su | | C10K 3/04 |
| | | | | | 423/220 |
| 2014/0076165 | A1* | 3/2014 | Nakayama | | B01D 53/78 |
| | | | | | 96/181 |
| 2014/0076708 | A1* | 3/2014 | Nakayama | | B01D 53/1475 |
| | | | | | 202/235 |
| 2014/0301927 | A1 | 10/2014 | Udatsu et al. | | |
| 2014/0373720 | A1* | 12/2014 | Nakagawa | | F23J 15/04 |
| | | | | | 96/234 |
| 2018/0236395 | A1* | 8/2018 | Naito | | B01J 20/165 |
| 2018/0243680 | A1* | 8/2018 | Naito | | B01D 53/96 |
| 2018/0318760 | A1* | 11/2018 | Hirata | | B01D 53/78 |
| 2021/0031136 | A1 | 2/2021 | Fujita et al. | | |
| 2021/0322921 | A1* | 10/2021 | Miyamoto | | B01D 53/78 |
| 2022/0153592 | A1* | 5/2022 | Sorimachi | | B01D 53/62 |
| 2022/0226770 | A1* | 7/2022 | Fujita | | B01D 53/185 |
| 2022/0410062 | A1 | 12/2022 | Tsutsumi et al. | | |

FOREIGN PATENT DOCUMENTS

| | | |
|---|---|---|
| JP | S54-134079 A | 10/1979 |
| JP | H04-293516 A | 10/1992 |
| JP | 2003-001056 A | 1/2003 |
| JP | 2013-130340 A | 7/2013 |
| JP | 6158054 B2 | 7/2017 |
| JP | 2021-020193 A | 2/2021 |
| WO | 2021-131629 A1 | 7/2021 |

OTHER PUBLICATIONS

Written Opinion issued in counterpart International Application No. PCT/JP2024/021748, dated Aug. 20, 2024 (9 pages).

* cited by examiner

CO$_2$ RECOVERY DEVICE

BACKGROUND OF THE INVENTION

Field of the Invention

The present disclosure relates to a CO$_2$ recovery device.

Description of Related Art

In recent years, a concentration of carbon dioxide contained in an atmosphere has attracted attention from the viewpoint of carbon neutrality. From the viewpoint of reducing the concentration of carbon dioxide in the atmosphere, a CO$_2$ recovery device that recovers carbon dioxide from an exhaust gas has been known. The CO$_2$ recovery device circulates an absorption liquid between a regeneration tower and an absorption tower to recover CO$_2$ from the exhaust gas.

For example, as the CO$_2$ recovery device, Patent Document 1 discloses a carbon dioxide recovery system. This carbon dioxide recovery system includes an absorption tower that removes carbon dioxide by bringing an exhaust gas containing carbon dioxide into contact with an absorption liquid for absorbing the carbon dioxide, and a regeneration tower that separates the carbon dioxide from the absorption liquid discharged from the absorption tower. Furthermore, this carbon dioxide recovery system introduces a first gas having a higher carbon dioxide concentration than the exhaust gas and a second gas having a lower carbon dioxide concentration than the exhaust gas into a treatment object gas line for introducing the exhaust gas into the absorption tower. As a result, stable operation is maintained even when a carbon dioxide concentration or a gas flow rate of a treatment object gas is rapidly changed.

PRIOR ART DOCUMENT

Patent Document

[Patent Document 1] Japanese Patent No. 6158054

SUMMARY OF THE INVENTION

Incidentally, a demister is disposed in the absorption tower to remove a mist component associated with the exhaust gas before releasing the exhaust gas into the atmosphere. The demister has a property that the flow rate of the supplied exhaust gas decreases and the flow velocity of the passing exhaust gas decreases, resulting in deterioration of the mist removal performance. However, in the CO$_2$ recovery device, the flow rate of the supplied exhaust gas may decrease due to a change in a condition of a supply source of the exhaust gas. Therefore, in the CO$_2$ recovery device, even when the flow rate of the supplied exhaust gas decreases, it is required to suppress a decrease in the flow velocity of a fluid supplied to the demister disposed in the absorption tower.

The present disclosure provides a CO$_2$ recovery device capable of suppressing a decrease in the flow velocity of a fluid supplied to a demister.

A CO$_2$ recovery device according to the present disclosure includes: a cooling tower into which an exhaust gas containing carbon dioxide is introduced to cool the exhaust gas; and an absorption tower into which the exhaust gas cooled in the cooling tower is introduced and which brings the exhaust gas into contact with an absorption liquid to remove the carbon dioxide from the exhaust gas, in which the absorption tower has an absorption tower body through which the exhaust gas is flowable and which has a tubular shape, and a demister that is disposed inside the absorption tower body and is configured to remove mist contained in the exhaust gas as the exhaust gas flows therethrough, and the CO$_2$ recovery device further comprises a flow velocity regulating section that is configured to regulate the flow velocity of the exhaust gas flowing through the demister to be within a predetermined range.

According to the CO$_2$ recovery device of the present disclosure, it is possible to suppress a decrease in the flow velocity of the fluid supplied to the demister.

DETAILED DESCRIPTION OF THE INVENTION

Hereinafter, an embodiment for implementing a CO$_2$ recovery device according to the present disclosure will be described with reference to the accompanying drawings. However, the present disclosure is not limited to this embodiment.

First Embodiment (CO$_2$ Recovery Device)

Figure 1:
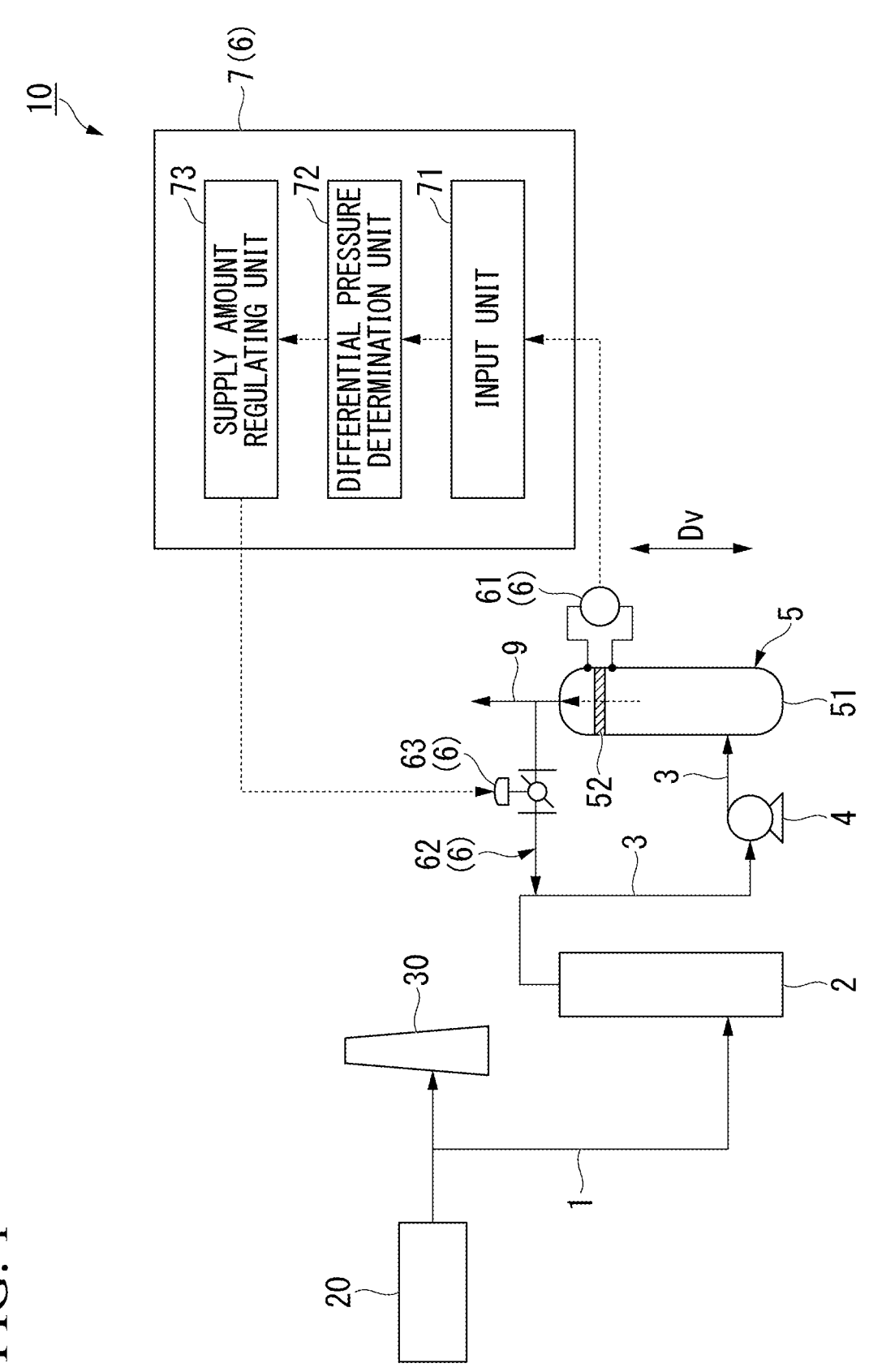
FIG. 1 is a schematic view showing a CO$_2$ recovery device according to a first embodiment.

A CO$_2$ recovery device 10 can recover carbon dioxide (CO$_2$) from an exhaust gas from an exhaust gas generation source 20. Examples of the exhaust gas generation source 20 include a boiler, an incinerator, and a gas turbine. As shown in FIG. 1, a part of the exhaust gas supplied from the exhaust gas generation source 20 is sent to the CO$_2$ recovery device 10. A residual part of the exhaust gas is sent to a smokestack 30 and exhausted into an atmosphere.

The CO$_2$ recovery device 10 according to the present embodiment can separate and recover carbon dioxide contained in the exhaust gas by using an absorption liquid, and can supply the recovered carbon dioxide to another device. The CO$_2$ recovery device 10 includes a supply line 1, a cooling tower 2, a cooling line 3, a blower (flow velocity increasing section 4), an absorption tower 5, and a flow velocity regulating section 6.

The supply line 1 sends a part of the carbon dioxide-containing exhaust gas generated in the exhaust gas generation source 20 to the cooling tower 2. The supply line 1 is a pipe that connects the exhaust gas generation source 20 and the cooling tower 2.

The carbon dioxide-containing exhaust gas is introduced into the cooling tower 2 via the supply line 1. The cooling tower 2 cools the introduced exhaust gas. The exhaust gas cooled in the cooling tower 2 is sent to the cooling line 3. In the cooling tower 2, the exhaust gas at a temperature of 100° C. or higher (for example, about 150° C.) is cooled to 100° C. or lower (for example, about 40° C.).

The cooling line 3 sends the exhaust gas cooled in cooling tower 2 to the absorption tower 5 via the blower 4. The cooling line 3 is a pipe that connects the cooling tower 2 and the absorption tower 5.

The blower 4 is disposed in the middle of the cooling line 3. The blower 4 increases the flow velocity of the exhaust gas cooled in the cooling tower 2 and supplies the exhaust gas having the increased flow velocity to the absorption tower 5. Specifically, the blower 4 can boost the exhaust gas flowing through the cooling line 3. The blower 4 increases the flow velocity of the exhaust gas to be introduced into the absorption tower 5 by boosting the exhaust gas flowing through the cooling line 3. The blower 4 can change the boosting rate of the exhaust gas.

The exhaust gas cooled in the cooling tower 2 is introduced into the absorption tower 5 via the cooling line 3. The absorption tower 5 brings the exhaust gas into contact with an absorption liquid to remove carbon dioxide from the exhaust gas. Examples of the absorption liquid include an amine-based solution. The absorption tower 5 sends the exhaust gas from which the carbon dioxide has been removed, to an exhaust line 9. In addition, the absorption tower 5 sends the absorption liquid that has recovered the carbon dioxide, to a regeneration tower (not shown). The absorption tower 5 according to the present embodiment includes an absorption tower body 51 and a demister 52.

The absorption tower body 51 is a container extending in a vertical direction Dv and having a tubular shape. The exhaust gas can flow inside the absorption tower body 51 from below to above in the vertical direction Dv. An absorption liquid is stored in the vicinity of a bottom of the absorption tower body 51. The cooling line 3 is connected to the bottom of the absorption tower body 51. The exhaust line 9 is connected to a top of the absorption tower body 51.

The demister 52 can remove mist (droplets having a small particle size) contained in the exhaust gas as the exhaust gas flows therethrough. The demister 52 is disposed inside the absorption tower body 51. The exhaust gas after coming into contact with the absorption liquid can flow through the demister 52 inside the absorption tower body 51. The exhaust gas flows through the demister 52 from below to above in the vertical direction Dv. The demister 52 is formed by, for example, stacking several layers of nets woven with thin wires. In the present embodiment, the demisters 52 are arranged in a plurality of layers in a flow direction (a direction from below to above in the vertical direction Dv) of the exhaust gas in the absorption tower 5.

The exhaust line 9 exhausts the exhaust gas from which the carbon dioxide has been removed in the absorption tower 5, to the atmosphere. The exhaust line 9 is a pipe that connects the absorption tower 5 and an outside.

The flow velocity regulating section 6 is configured to regulate the flow velocity of a fluid flowing through the demister 52 to be within a predetermined range. That is, the flow velocity regulating section 6 is configured to maintain the flow velocity of the fluid flowing through the demister 52 at a nearly constant value. The flow velocity regulating section 6 according to a first embodiment controls the flow rate of the exhaust gas supplied to the absorption tower 5 to be in a nearly constant state by using a differential pressure around the demister 52 in the absorption tower body 51. That is, the flow velocity regulating section 6 regulates the flow velocity of the fluid before being supplied to the demister 52 to a nearly constant state by setting the flow rate of the exhaust gas supplied to the absorption tower 5 to be in a nearly constant state based on the differential pressure around the demister 52. The flow velocity regulating section 6 has a differential pressure acquisition unit 61, an additional supply line 62, a flow rate regulating valve 63, and a control unit 7.

The differential pressure acquisition unit 61 acquires information on a differential pressure between the pressure of the exhaust gas before being supplied to the demister 52 inside the absorption tower body 51 and the pressure of the exhaust gas after passing through the demister 52 inside the absorption tower 5. The differential pressure acquisition unit 61 determines a differential pressure between a position upstream of the demister 52 and a position downstream of the demister 52 in the flow direction of the exhaust gas in the absorption tower 5. The differential pressure acquisition unit 61 according to the present embodiment has a differential pressure gauge that determines the differential pressure between a position below the demister 52 and a position above the demister 52 in the vertical direction Dv. The differential pressure acquisition unit 61 sends the acquired information on the differential pressure to the control unit 7.

The additional supply line 62 can additionally supply a fluid other than the exhaust gas cooled in the cooling tower 2, to the cooling line 3. The additional supply line 62 further supplies the fluid to the exhaust gas before being supplied to the blower 4 after being cooled in the cooling tower 2. The additional supply line 62 is a pipe that connects the exhaust line 9 and the cooling line 3. The additional supply line 62 is connected to the cooling line 3 between the cooling tower 2 and the blower 4. The additional supply line 62 can supply a part of the exhaust gas from which the carbon dioxide and mist have been removed in the absorption tower 5 to the cooling line 3 as the fluid.

The flow rate regulating valve 63 can regulate a supply amount of the fluid through the additional supply line 62. The flow rate regulating valve 63 is disposed in the middle of the additional supply line 62. The flow rate regulating valve 63 regulates the supply amount of the fluid to be supplied to the cooling line 3 by regulating the flow rate of the fluid flowing through the additional supply line 62. The opening of the flow rate regulating valve 63 is controlled by the control unit 7. The flow rate regulating valve 63 may be, for example, an on-off valve with an opening of 0% or 100%, and may be a regulating valve such as a butterfly valve adjustable to have any opening, or a damper with a plurality of blades.

The control unit 7 can control the opening of the flow rate regulating valve 63. The control unit 7 according to the first embodiment can control the opening of the flow rate regulating valve 63 based on the information on the differential pressure acquired by the differential pressure acquisition unit 61. Specifically, the control unit 7 controls to increase the opening of the flow rate regulating valve 63 in a case in which the differential pressure acquired by the differential pressure acquisition unit 61 is below a specified differential pressure value determined in advance. The control unit 7 according to the first embodiment has an input unit 71, a differential pressure determination unit 72, and a supply amount regulating unit 73.

The input unit 71 acquires the information on the differential pressure from the differential pressure acquisition unit 61. The differential pressure determination unit 72 receives the information on the differential pressure from the input unit 71. The differential pressure determination unit 72 determines whether or not the differential pressure acquired by the differential pressure acquisition unit 61 is below a specified differential pressure value determined in advance. The specified differential pressure value is a value determined in advance, and is a value of the differential pressure at which the performance of the demister 52 can be considered as not being sufficiently exhibited. The value of the differential pressure at which the performance of the demister 52 can be considered as not being sufficiently exhibited is a value of the differential pressure at which the absorption tower 5 cannot maintain the flow velocity of the exhaust gas that can ensure a mist removal rate required for the demister 52 due to a small flow rate of the exhaust gas flowing in the absorption tower body 51. That is, the specified differential pressure value is a value at which the mist removal rate required for the demister 52 can be considered to have decreased. In a case in which the acquired information on the differential pressure is below the specified differential pressure value, the differential pressure determination unit 72 sends the information to the supply amount regulating unit 73.

The supply amount regulating unit 73 causes the flow rate regulating valve 63 to regulate the supply amount of the fluid through the additional supply line 62 based on a determination result of the differential pressure determination unit 72. Specifically, the supply amount regulating unit 73 changes the opening of the flow rate regulating valve 63 based on the determination result of the differential pressure determination unit 72. The supply amount regulating unit 73 acquires information on the determination result from the differential pressure determination unit 72. In a case in which the information on the determination result that the information on the differential pressure is below the specified differential pressure value is acquired, the supply amount regulating unit 73 widens the opening of the flow rate regulating valve 63 to increase the supply amount of the fluid through the additional supply line 62. In a case in which the information on the determination result that the information on the differential pressure is not below (above) the specified differential pressure value is acquired, the supply amount regulating unit 73 narrows the opening of the flow rate regulating valve 63 to reduce the supply amount of the fluid through the additional supply line 62. As a result, the supply amount regulating unit 73 according to the present embodiment regulates the supply amount of the exhaust gas through the additional supply line 62 such that the flow rate of the exhaust gas flowing through the cooling line 3 approaches a constant value.

(Action Effect)

In the $CO_2$ recovery device 10, a part of the exhaust gas supplied from the exhaust gas generation source 20 is sent to the cooling tower 2 via the supply line 1. In the cooling tower 2, the exhaust gas is cooled to 100° C. or lower. The exhaust gas cooled in the cooling tower 2 is sent to the blower 4 via the cooling line 3. The blower 4 boosts the supplied exhaust gas. The exhaust gas, which has been boosted and whose flow velocity has been increased, is sent to the absorption tower 5 via the cooling line 3. The absorption tower 5 removes carbon dioxide from the exhaust gas by bringing the exhaust gas into contact with the absorption liquid in the absorption tower body 51. In addition, the exhaust gas from which the carbon dioxide has been removed passes through the demister 52 inside the absorption tower body 51. The demister 52 is supplied with the exhaust gas at a constant flow rate, so that the exhaust gas flows in at the flow velocity at which a mist removal function of the demister 52 can be ensured. As a result, the mist in the exhaust gas is removed by the demister 52. In addition, inside the absorption tower body 51, the differential pressure between the pressure of the exhaust gas before passing through the demister 52 and the pressure of the exhaust gas after passing through the demister 52 becomes larger than the specified differential pressure value. The exhaust gas from which the carbon dioxide and mist have been removed by the absorption tower 5 is exhausted into the atmosphere via the exhaust line 9. In addition, a part of the exhaust gas sent to the exhaust line 9 is sent to the additional supply line 62 without being discharged into the atmosphere.

Here, in a case in which the flow rate of the exhaust gas supplied to the absorption tower 5 decreases, the flow velocity of the exhaust gas supplied to the demister 52 decreases. However, the flow velocity regulating section 6 regulates the flow velocity of the fluid flowing through the demister 52 to be within a predetermined range. Therefore, the flow velocity of the exhaust gas flowing through the demister 52 is maintained at a nearly constant value. In this way, even when the flow rate of the exhaust gas supplied from the exhaust gas generation source 20 decreases, the demister 52 can continue to be supplied with the fluid with a constant flow velocity. Therefore, a decrease in the flow velocity of the fluid supplied to the demister 52 can be suppressed.

Specifically, as the flow velocity of the exhaust gas supplied to the demister 52 decreases, the differential pressure between the pressure of the exhaust gas before being supplied to the demister 52 and the pressure of the exhaust gas after passing through the demister 52 becomes smaller inside the absorption tower body 51. Then, in a case in which the differential pressure inside the absorption tower body 51 is below the specified differential pressure value, the differential pressure determination unit 72 that has acquired the information on the differential pressure from the differential pressure acquisition unit 61 sends the information indicating that the differential pressure is below the specified differential pressure value, to the supply amount regulating unit 73. Accordingly, the supply amount regulating unit 73 controls the flow rate regulating valve 63 to widen the opening. As a result, the exhaust gas sent to the additional supply line 62 is sent again to the cooling line 3 through the flow rate regulating valve 63. That is, not only the exhaust gas before removing the carbon dioxide, which has been sent from the cooling tower 2 but also the exhaust gas from which the carbon dioxide has been removed from the additional supply line 62 is supplied to the cooling line 3. As a result, the flow rate of the exhaust gas supplied to the absorption tower 5 through the cooling line 3 is increased. As the flow rate of the exhaust gas supplied to the absorption tower 5 is increased, the flow rate of the exhaust gas flowing in the absorption tower body 51 is increased, and the flow velocity of the exhaust gas flowing through the demister 52 inside the absorption tower body 51 is increased. As a result, the flow velocity of the exhaust gas flowing through the demister 52 inside the absorption tower body 51 is maintained at a nearly constant value. In this way, even when the flow rate of the exhaust gas supplied from the exhaust gas generation source 20 decreases, the decrease in the supply amount of the exhaust gas to the demister 52 can be quickly grasped by using the information on the differential pressure around the demister 52 inside the absorption tower body 51, and the demister 52 can continue to be supplied with the exhaust gas with a constant flow velocity. Therefore, a decrease in the flow velocity of the fluid supplied to the demister 52 can be suppressed.

In addition, the exhaust gas from which the carbon dioxide has been removed in the absorption tower 5 is supplied again to the cooling line 3 through the additional supply line 62 so that the exhaust gas is circulated. In this way, the exhaust gas from which the carbon dioxide has been removed is circulated by the additional supply line 62, whereby it is possible to reuse the exhaust gas to increase the flow rate of the fluid supplied to the absorption tower 5 without preparing a new fluid separately.

In addition, the exhaust gas from which the carbon dioxide has been removed in the absorption tower 5 is supplied through the additional supply line 62, whereby it is possible to suppress a supply of a cold fluid to the cooling line 3 as compared with a case in which air in the atmosphere is supplied to the cooling line 3. In addition, when a cold fluid is supplied, such as when a temperature of the atmosphere is low, it is necessary to separately prepare a heater and regulate the temperature before supplying the cold fluid to the cooling line 3. However, the temperature regulation can be made unnecessary by sending the exhaust gas again through the additional supply line 62. Furthermore, the oxygen contained in the exhaust gas is less than the oxygen contained in the air. Therefore, an increase in a content of the oxygen in the fluid supplied to the absorption tower 5 can be suppressed. As a result, it is possible to suppress the oxidative deterioration of the absorption liquid that comes into contact with the exhaust gas as a fluid in the absorption tower 5.

Second Embodiment

Figure 2:
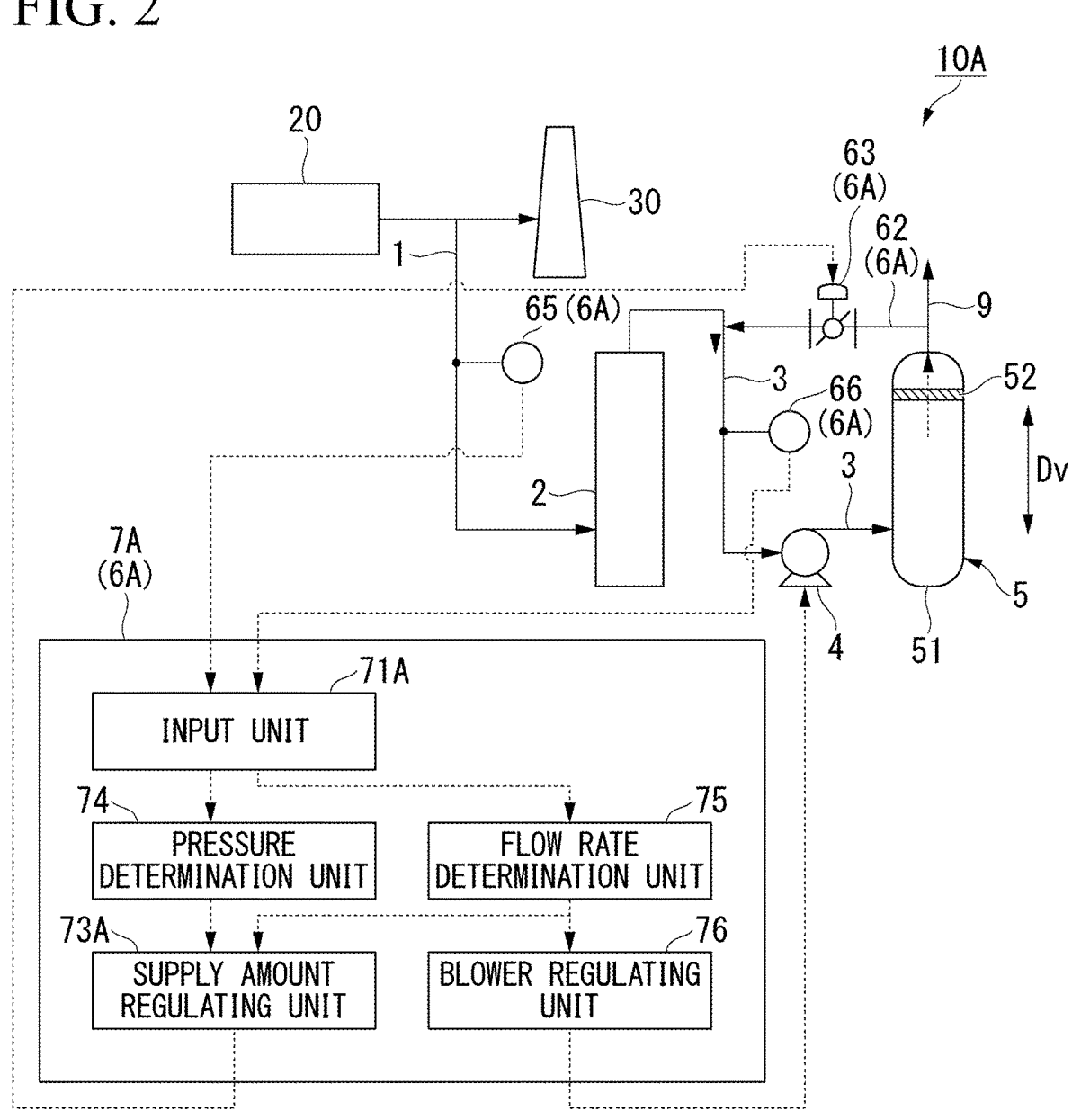
FIG. 2 is a schematic view showing a CO$_2$ recovery device according to a second embodiment.

Next, a $CO_2$ recovery device 10A according to a second embodiment according to the present disclosure will be described. In the second embodiment described below, the same configurations as those in the first embodiment are denoted by the same reference numerals in the drawing, and descriptions thereof will be omitted. As shown in FIG. 2, the second embodiment is different from the first embodiment in that a flow velocity regulating section 6A does not use the differential pressure inside the absorption tower body 51, but uses the pressure of the exhaust gas supplied to the cooling tower 2.

The flow velocity regulating section 6A according to the second embodiment uses the pressure of the exhaust gas supplied to the cooling tower 2 from the exhaust gas generation source 20 to control the flow rate of the exhaust gas supplied to the absorption tower 5. That is, the flow velocity regulating section 6A regulates the flow velocity of the fluid before being supplied to the demister 52 to a nearly constant state by setting the flow rate of the exhaust gas supplied to the absorption tower 5 to be in a nearly constant state based on the pressure of the exhaust gas supplied to the cooling tower 2. The flow velocity regulating section 6A has a pressure acquisition unit 65, a flow rate acquisition unit 66, an additional supply line 62, a flow rate regulating valve 63, and a control unit 7A.

The pressure acquisition unit 65 acquires information on the pressure of the exhaust gas before being supplied to the cooling tower 2. The pressure acquisition unit 65 determines the pressure of the exhaust gas in the supply line 1. The pressure acquisition unit 65 according to the present embodiment has a pressure gauge that determines the pressure at a position in the supply line 1 through which the exhaust gas excluding the exhaust gas sent to the smokestack 30 flows. The pressure acquisition unit 65 sends the acquired information on the pressure to the control unit 7A.

The flow rate acquisition unit 66 acquires information on the flow rate of the exhaust gas before being supplied to the blower 4 after being cooled in the cooling tower 2. The flow rate acquisition unit 66 determines the flow rate of the exhaust gas flowing through the cooling line 3 between the cooling tower 2 and the blower 4. The flow rate acquisition unit 66 has a flow meter that determines the flow rate of the exhaust gas at a position closer to the blower 4 than a connection portion between the cooling line 3 and the additional supply line 62. The flow rate acquisition unit 66 sends the acquired information on the flow rate to the control unit 7A.

The control unit 7A can control the opening of the flow rate regulating valve 63. The control unit 7A according to the second embodiment can control the opening of the flow rate regulating valve 63 based on the information on the pressure acquired by the pressure acquisition unit 65. Specifically, the control unit 7A controls to increase the opening of the flow rate regulating valve 63 in a case in which the pressure acquired by the pressure acquisition unit 65 is below a specified pressure value determined in advance. Furthermore, the control unit 7A according to the second embodiment can control the flow rate of the exhaust gas in the blower 4 based on the acquired information on the flow rate by the flow rate acquisition unit 66. Specifically, the control unit 7A controls to increase the flow rate of the exhaust gas in the blower 4 in a case in which the flow rate acquired by the flow rate acquisition unit 66 is below a specified flow rate value. The control unit 7A has an input unit 71A, a pressure determination unit 74, a flow rate determination unit 75, a blower regulating unit 76, and a supply amount regulating unit 73A.

The input unit 71A acquires the information on the pressure in the supply line 1 from the pressure acquisition unit 65. In addition, the input unit 71A acquires the information on the flow rate in the cooling line 3 from the flow rate acquisition unit 66.

The pressure determination unit 74 receives the information on the pressure from the input unit 71A. The pressure determination unit 74 determines whether or not the pressure acquired by the pressure acquisition unit 65 is below the specified pressure value determined in advance. The specified pressure value is a value determined in advance, and is a value of the pressure at which the performance of the demister 52 can be considered as not being sufficiently exhibited. It is necessary to control the value of the pressure acquisition unit 65 to be constant in order not to give disturbance to the exhaust gas generation source. In a case in which the acquired information on the pressure is below the specified pressure value, the pressure determination unit 74 sends the information to the supply amount regulating unit 73A.

The flow rate determination unit 75 receives the information on the flow rate from the input unit 71A. The flow rate determination unit 75 determines whether or not the flow rate acquired by the flow rate acquisition unit 66 is below the specified flow rate value determined in advance. The specified flow rate value is a value determined in advance, and is a value of the flow rate at which the flow rate of the exhaust gas supplied to the absorption tower 5 from the blower 4 can be considered to have decreased. That is, the specified flow rate value is a value at which the flow rate of the exhaust gas required for the absorption tower 5 can be considered as not being ensured. In a case in which the acquired information on the flow rate is below the specified flow rate value, the flow rate determination unit 75 sends the information to the blower regulating unit 76 and the supply amount regulating unit 73A.

The blower regulating unit 76 regulates the flow rate of the exhaust gas in the blower 4 based on a determination result of the flow rate determination unit 75. Specifically, the blower regulating unit 76 acquires information on the determination result from the flow rate determination unit 75. In a case in which the information on the determination result that the information on the flow rate is below the specified flow rate value is acquired, the blower regulating unit 76 increases the flow rate of the exhaust gas in the blower 4 to greatly increase the flow velocity of the exhaust gas flowing through the cooling line 3. In a case in which the information on the determination result that the information on the pressure is not below (above) the specified pressure value is acquired, the blower regulating unit 76 decreases the flow rate in the blower 4 to reduce an increase rate of the flow velocity of the exhaust gas in the cooling line 3.

The supply amount regulating unit 73A causes the flow rate regulating valve 63 to regulate the supply amount of the fluid through the additional supply line 62 based on a determination result of the pressure determination unit 74. In a case in which the information on the determination result that the information on the pressure is below the specified pressure value is acquired, the supply amount regulating unit 73A widens the opening of the flow rate regulating valve 63 to increase the supply amount of the fluid through the additional supply line 62. In a case in which the information on the determination result that the information on the pressure is not below (above) the specified pressure value is acquired, the supply amount regulating unit 73A narrows the opening of the flow rate regulating valve 63 to reduce the supply amount of the fluid through the additional supply line 62.

(Action Effect)

In the $CO_2$ recovery device 10A according to the second embodiment, in a case in which the flow rate of the exhaust gas supplied from the exhaust gas generation source 20 decreases and the flow rate of the exhaust gas supplied to the absorption tower 5 decreases, the flow rate of the exhaust gas flowing through the cooling line 3 also decreases. Therefore, the value of the flow rate acquired by the flow rate acquisition unit 66 also decreases. Then, in a case in which the flow rate in the cooling line 3 is below the specified flow rate value, the flow rate determination unit 75 that has acquired the information on the flow rate from the flow rate acquisition unit 66 sends the information indicating that the flow rate is below the specified flow rate value, to the blower regulating unit 76 and the supply amount regulating unit 73A. As a result, the blower regulating unit 76 increases the flow rate in the blower 4 to increase the increase rate of the flow velocity of the exhaust gas in the cooling line 3. As a result, the flow velocity of the exhaust gas flowing through the cooling line 3 is regulated such that the flow rate of the exhaust gas supplied to the absorption tower 5 approaches a constant value.

Furthermore, when the flow rate of the exhaust gas supplied from the exhaust gas generation source 20 further decreases, the flow rate of the exhaust gas supplied to the absorption tower 5 decreases even when the boosting rate of the blower 4 is increased by the blower regulating unit 76.

That is, not only the flow rate of the exhaust gas flowing through the cooling line 3 but also the flow rate of the exhaust gas flowing through the supply line 1 decreases. As the flow rate of the exhaust gas flowing through the supply line 1 decreases, the value of the pressure acquired by the pressure acquisition unit 65 also decreases. Then, in a case in which the pressure inside the supply line 1 is below the specified pressure value, the pressure determination unit 74 that has acquired the information on the pressure from the pressure acquisition unit 65 sends the information indicating that the pressure is below the specified pressure value, to the supply amount regulating unit 73A. Furthermore, as described above, the information indicating that the flow rate is below the specified flow rate value is also sent to the supply amount regulating unit 73A from the flow rate determination unit 75. Accordingly, the supply amount regulating unit 73A controls the opening of the flow rate regulating valve 63 to widen the opening. Therefore, the exhaust gas sent to the additional supply line 62 is sent again to the cooling line 3 through the flow rate regulating valve 63. That is, as in the first embodiment, not only the exhaust gas before removing the carbon dioxide, which has been sent from the cooling tower 2 but also the exhaust gas from which the carbon dioxide has been removed from the additional supply line 62 is supplied to the cooling line 3. As a result, the flow rate of the exhaust gas supplied to the absorption tower 5 is increased. As the flow rate of the exhaust gas supplied to the absorption tower 5 is increased, the flow velocity of the exhaust gas flowing through the demister 52 inside the absorption tower body 51 is increased. As a result, the flow velocity of the exhaust gas flowing through the demister 52 inside the absorption tower body 51 is maintained at a nearly constant value. In this way, even when the flow rate of the exhaust gas supplied from the exhaust gas generation source 20 decreases, the decrease in the supply amount of the exhaust gas to the demister 52 can be quickly grasped by using the information on the pressure of the exhaust gas flowing through the supply line 1, and the demister 52 can continue to be supplied with the exhaust gas with a constant flow velocity. Therefore, a decrease in the flow velocity of the fluid supplied to the demister 52 can be suppressed.

In addition, in the second embodiment, not only the information on the pressure of the exhaust gas flowing through the supply line 1 but also the information on the flow rate of the exhaust gas flowing through the cooling line 3 is used. Therefore, a decrease in the supply amount of the exhaust gas to the demister 52 can be quickly grasped with higher accuracy.

Furthermore, the flow rate in the blower 4 is regulated based on the information on the flow rate of the exhaust gas flowing through the cooling line 3. Therefore, the flow rate of the exhaust gas supplied to the absorption tower 5 can be finely regulated. Therefore, the demister 52 can continue to be supplied with the exhaust gas with a constant flow velocity with high accuracy. Therefore, it is possible to suppress a decrease in the flow rate of the exhaust gas supplied to the demister 52 with higher accuracy.

Third Embodiment

Figure 3:
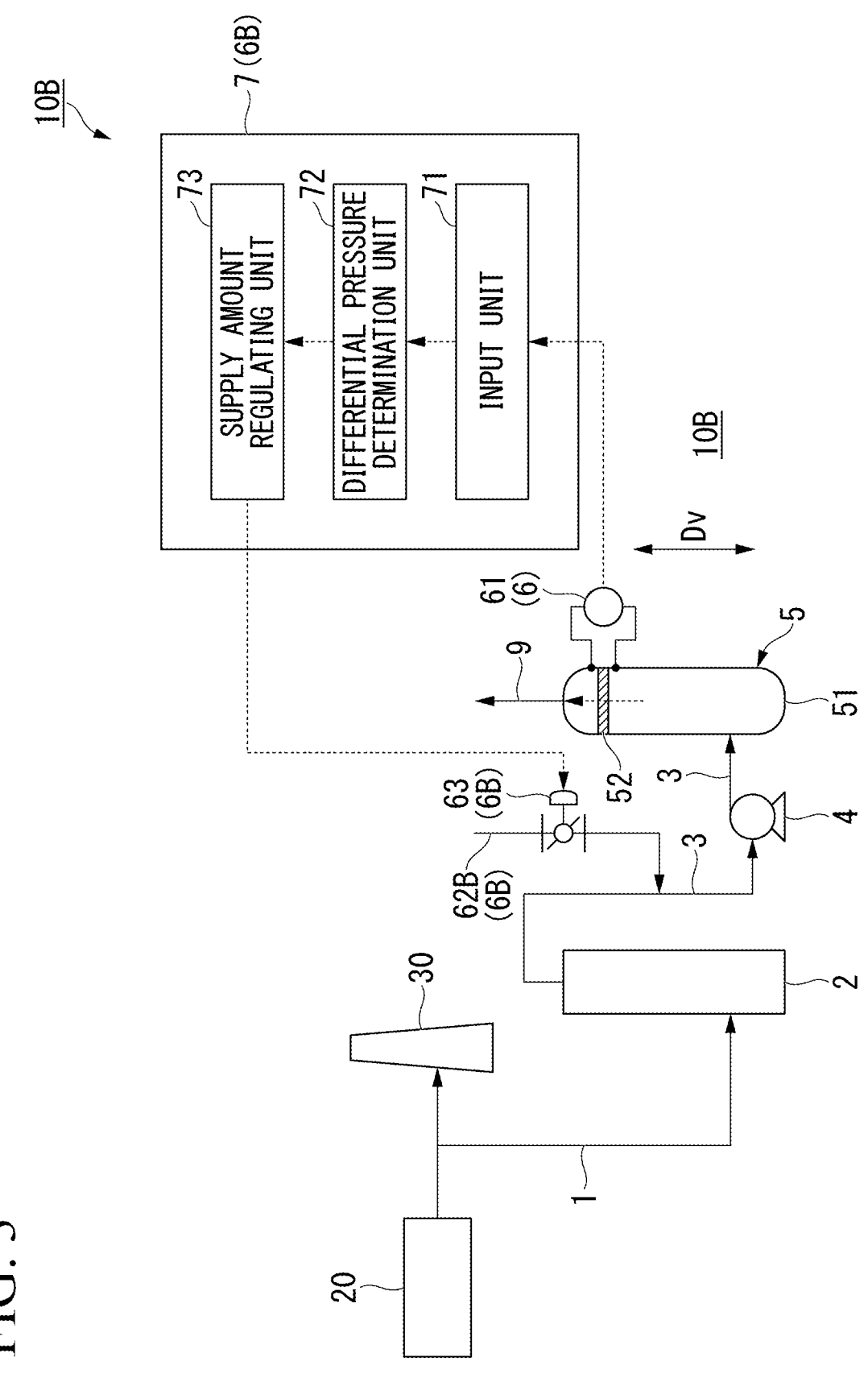
FIG. 3 is a schematic view showing a CO$_2$ recovery device according to a third embodiment.

Next, a $CO_2$ recovery device 10B according to a third embodiment according to the present disclosure will be described. In the third embodiment to be described below, the same configurations as those in the first embodiment are denoted by the same reference numerals in the drawing, and descriptions thereof will be omitted. As shown in FIG. 3, the third embodiment is different from the first embodiment in that an additional supply line 62B is not connected to the exhaust line 9.

A flow velocity regulating section 6B according to the third embodiment supplies air to the cooling line 3 as a fluid. The flow velocity regulating section 6B according to the third embodiment is different from the flow velocity regulating section of the first embodiment only in the additional supply line 62B.

The additional supply line 62B according to the third embodiment can supply air (outside air) as a fluid other than the exhaust gas from an outside of the $CO_2$ recovery device 10B, to the cooling line 3. The additional supply line 62B further supplies air from the outside to the exhaust gas before being supplied to the blower 4 after being cooled in the cooling tower 2. The additional supply line 62B is a pipe that connects the outside of the $CO_2$ recovery device 10B and the cooling line 3. That is, the additional supply line 62B according to the third embodiment is not connected to the exhaust line 9. The additional supply line 62B is connected to the cooling line 3 between the cooling tower 2 and the blower 4. In addition, a filter capable of recovering foreign matter such as dust in the air may be separately disposed in the additional supply line 62B.

(Action Effect)

In the $CO_2$ recovery device 10B according to the third embodiment, when the opening of the flow rate regulating valve 63 is controlled by the supply amount regulating unit 73, the air is supplied from the atmosphere instead of the exhaust gas via the additional supply line 62B. Therefore, the air is sent to the exhaust gas flowing through the cooling line 3 through the flow rate regulating valve 63. Therefore, not only the exhaust gas before removing the carbon dioxide, which has been sent from the cooling tower 2 but also the air from the outside is supplied to the cooling line 3. As a result, the absorption tower 5 is supplied with a fluid in which the exhaust gas and the air are mixed, and the flow rate of the fluid supplied to the absorption tower 5 is increased. As the flow rate of the fluid supplied to the absorption tower 5 is increased, the flow velocity of the fluid flowing through the demister 52 inside the absorption tower body 51 is increased. As a result, the flow velocity of the fluid flowing through the demister 52 inside the absorption tower body 51 is maintained at a nearly constant value. In this way, even when the flow rate of the exhaust gas supplied from the exhaust gas generation source 20 decreases, the demister 52 can continue to be supplied with the fluid with a constant flow velocity by using the outside air.

Furthermore, by supplying the air instead of the exhaust gas from the additional supply line 62B, it is not necessary to connect the additional supply line 62B from the exhaust line 9 to the cooling line 3. That is, it is not necessary to lead an exhaust gas duct from an outlet of the absorption tower 5, and the facility of the $CO_2$ recovery device 10C can be simplified.

Fourth Embodiment

Figure 4:
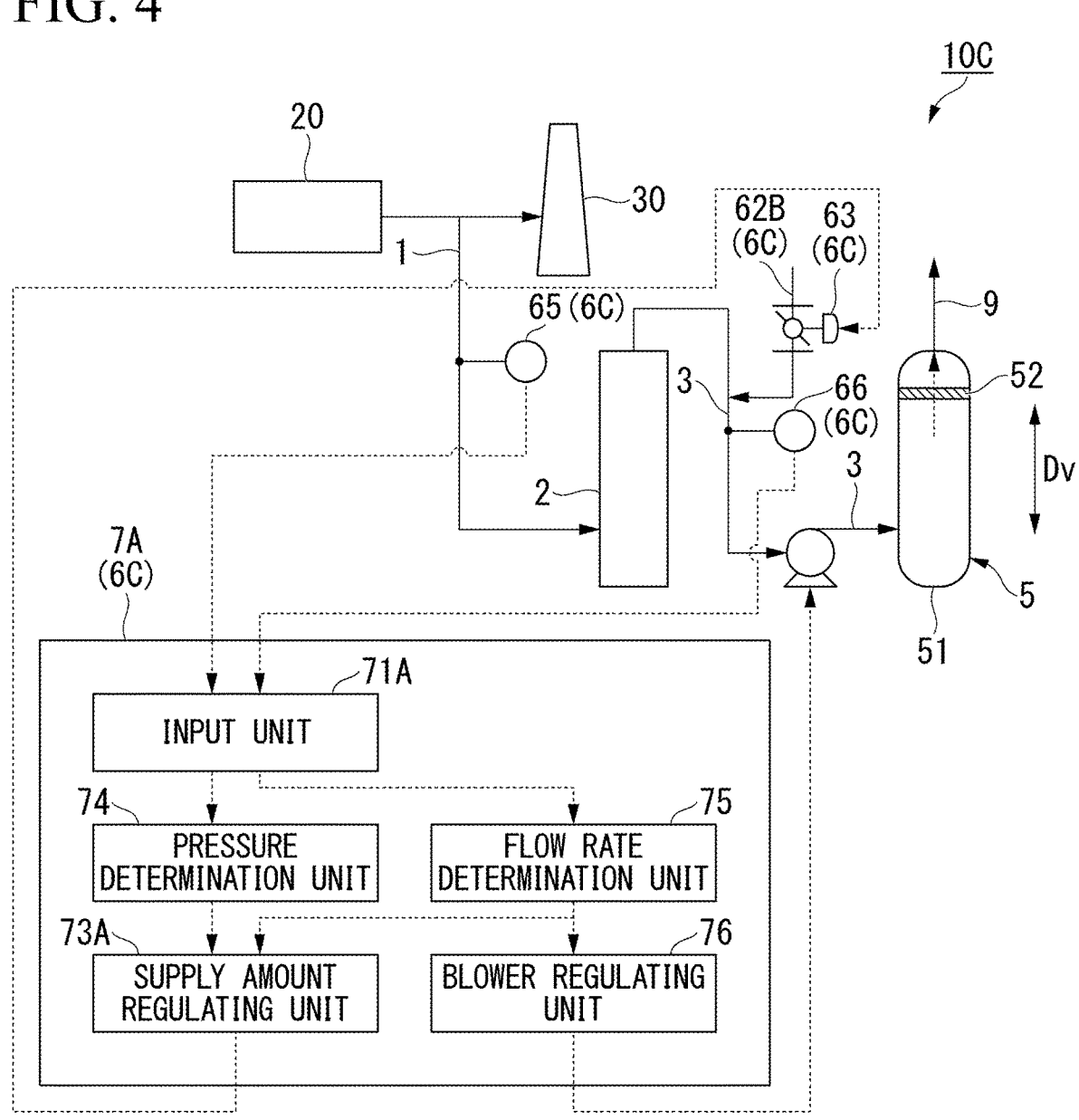
FIG. 4 is a schematic view showing a CO$_2$ recovery device according to a fourth embodiment.

Next, a $CO_2$ recovery device 10C according to a fourth embodiment according to the present disclosure will be described. In addition, in the fourth embodiment described below, the same configurations as those in the first embodiment to the third embodiment are denoted by the same reference numerals in the drawing, and descriptions thereof will be omitted. As shown in FIG. 4, the fourth embodiment is different from the second embodiment in that an additional supply line 62B is not connected to the exhaust line 9.

A flow velocity regulating section 6C according to the fourth embodiment supplies air to the cooling line 3 as a fluid. The flow velocity regulating section 6C according to the fourth embodiment is different from the flow velocity regulating section of the second embodiment only in the additional supply line 62B, and is the same as the flow velocity regulating section of the third embodiment.

(Action Effect)

In the $CO_2$ recovery device 10C according to the fourth embodiment, as in the third embodiment, when the opening of the flow rate regulating valve 63 is controlled by the supply amount regulating unit 73A, the air is supplied from the atmosphere instead of the exhaust gas via the additional supply line 62B. Therefore, the air is sent to the exhaust gas flowing through the cooling line 3 through the flow rate regulating valve 63. In this way, the flow velocity of the fluid flowing through the demister 52 inside the absorption tower body 51 is maintained at a nearly constant value by the fluid in which the exhaust gas and the air are mixed. In this way, even when the flow rate of the exhaust gas supplied from the exhaust gas generation source 20 decreases, the demister 52 can continue to be supplied with the fluid with a constant flow velocity by using the outside air.

In addition, even when the air is supplied from the additional supply line 62B, not only the information on the pressure of the exhaust gas flowing through the supply line 1 but also the information on the flow rate of the exhaust gas flowing through the cooling line 3 is used. Therefore, as in the second embodiment, a decrease in the supply amount of the exhaust gas to the demister 52 can be quickly grasped with higher accuracy.

Furthermore, the flow rate in the blower 4 is regulated based on the information on the flow rate of the exhaust gas flowing through the cooling line 3. Therefore, the flow rate of the exhaust gas supplied to the absorption tower 5 can be finely regulated. Therefore, the demister 52 can continue to be supplied with the exhaust gas with a constant flow velocity with high accuracy. Therefore, as in the second embodiment, a decrease in the flow rate of the exhaust gas supplied to the demister 52 can be suppressed with higher accuracy.

Fifth Embodiment

Figure 5:
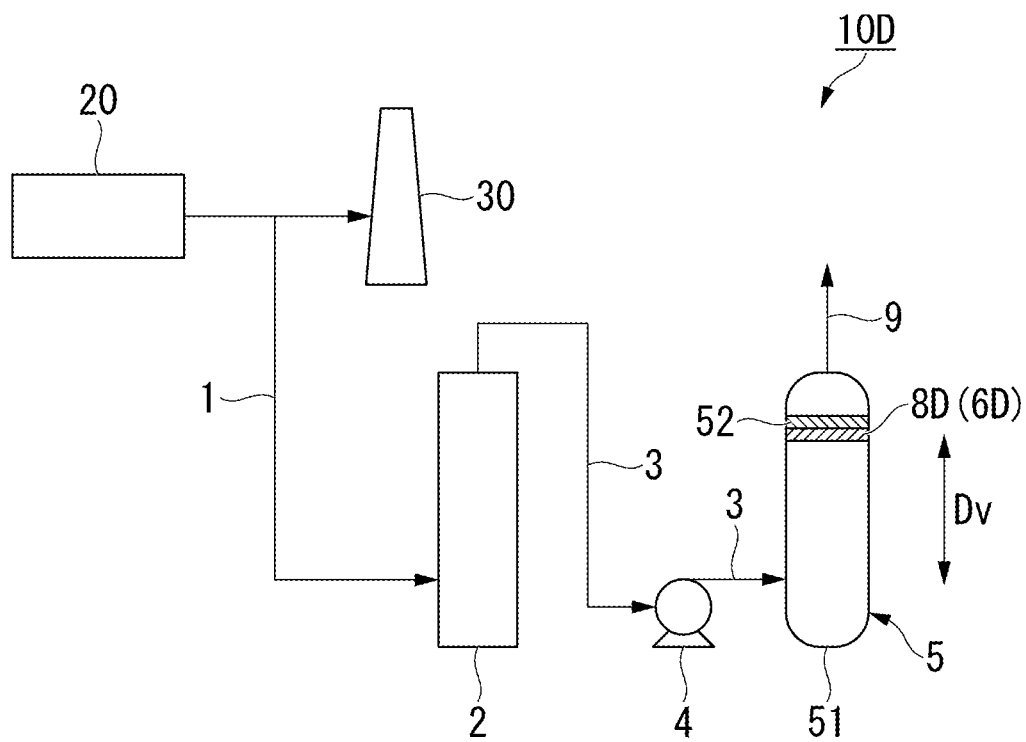
FIG. 5 is a schematic view showing a CO$_2$ recovery device according to a fifth embodiment.

Next, a $CO_2$ recovery device 10D according to a fifth embodiment according to the present disclosure will be described. In addition, in the fifth embodiment described below, the same configurations as those in the first embodiment to the fourth embodiment are denoted by the same reference numerals in the drawing, and descriptions thereof will be omitted. As shown in FIG. 5, the fifth embodiment is different from the first embodiment to the fourth embodiment in that the flow velocity of the exhaust gas supplied to the demister 52 is controlled not outside the absorption tower 5 but inside the absorption tower body 51.

A flow velocity regulating section 6D according to the fifth embodiment is configured to set the flow velocity of a fluid flowing through the demister 52 to be within a predetermined range inside the absorption tower body 51. The flow velocity regulating section 6D according to the fifth embodiment controls the flow rate of the exhaust gas supplied to the demister 52 inside the absorption tower body 51. That is, the flow velocity regulating section 6D regulates the flow velocity of the fluid before being supplied to the demister 52 to a nearly constant state by setting the flow rate of the exhaust gas supplied to the demister 52 to be in a nearly constant state inside the absorption tower body 51.

The flow velocity regulating section 6D does not have a configuration of controlling the flow rate of the exhaust gas supplied to the demister 52 outside the absorption tower body 51. The flow velocity regulating section 6D has an internal regulating portion 8D.

Figure 6:
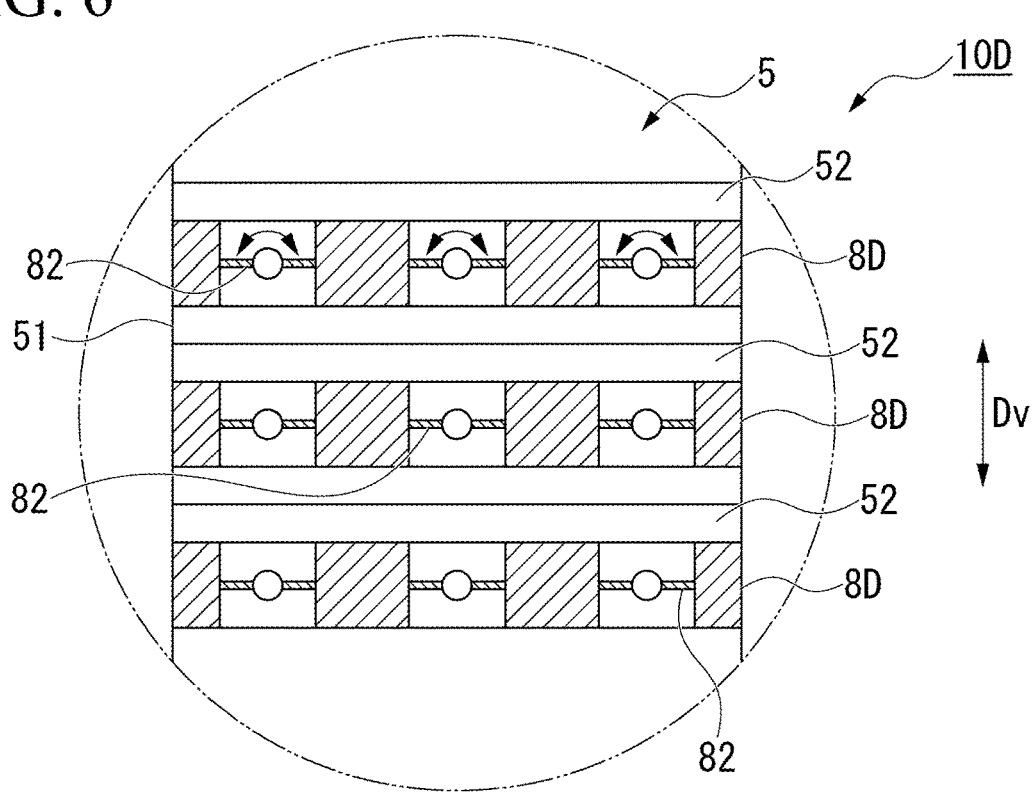
FIG. 6 is a schematic view showing a structure around a demister according to the fifth embodiment.

The internal regulating portion 8D is disposed inside the absorption tower body 51. The internal regulating portion 8D regulates the flow rate of the fluid supplied to the demister 52 inside the absorption tower body 51 such that the flow rate falls within a predetermined reference range. As shown in FIG. 6, the internal regulating portion 8D is disposed at a position upstream of the demister 52 in the flow direction of the exhaust gas. That is, the internal regulating portion 8D is disposed at a position below the demister 52 in the vertical direction Dv. In the fifth embodiment, in a case in which a plurality of the demisters 52 (for example, three layers) are disposed, the internal regulating portion 8D is disposed at a position upstream of each of the demisters 52 in a one-to-one relationship. Therefore, the internal regulating portions 8D as many as the number of the demisters 52 are disposed in the absorption tower body 51. The internal regulating portion 8D is disposed in contact with the demister 52. That is, the internal regulating portion 8D is disposed adjacent to a position below the demister 52 in the vertical direction Dv. Therefore, a plurality of the internal regulating portions 8D are disposed to close inlets of the plurality of demisters 52.

Further, the internal regulating portion 8D is a damper having a structure such as a butterfly valve having a plurality of rotating blades 82. The internal regulating portion 8D changes the flow rate of the exhaust gas supplied to the demister 52 according to a rotation angle of the blade 82. In the internal regulating portion 8D, the flow rate of the exhaust gas supplied to the demister 52 is maximized when the blade 82 rotates to a state close to being parallel to the flow direction of the exhaust gas (a state where the blade 82 extends straight in the vertical direction Dv). In addition, in the internal regulating portion 8D, the flow rate of the exhaust gas supplied to the demister 52 is minimized when the blade 82 rotates to a state close to being perpendicular to the flow direction of the exhaust gas (a state where the blade 82 extends perpendicularly in the vertical direction Dv). As a result, the internal regulating portion 8D according to the present embodiment regulates the supply amount of the exhaust gas to be supplied to the demister 52 so as to maintain the flow velocity of the exhaust gas supplied to the demister 52 constant.

(Action Effect)

In the $CO_2$ recovery device 10D according to the fifth embodiment, the flow rate of the exhaust gas supplied to the demister 52 inside the absorption tower body 51 is regulated by the internal regulating portion 8D. That is, even when the flow rate of the exhaust gas supplied to the absorption tower 5 decreases, the flow velocity of the exhaust gas when passing through the demister 52 inside the absorption tower body 51 is directly regulated. As a result, the flow velocity of the exhaust gas flowing through the demister 52 inside the absorption tower body 51 is maintained at a nearly constant value. In this way, even when the flow rate of the exhaust gas supplied from the exhaust gas generation source 20 decreases, the demister 52 can continue to be supplied with the exhaust gas with a constant flow velocity by the internal regulating portion 8D. Therefore, a decrease in the flow velocity of the exhaust gas supplied to the demister 52 can be suppressed.

In addition, the internal regulating portion 8D is disposed at a position upstream of the demister 52 in the flow direction of the exhaust gas. Therefore, the flow velocity of the exhaust gas immediately before passing through the demister 52 inside the absorption tower body 51 can be regulated by the internal regulating portion 8D. As a result, the flow velocity of the exhaust gas passing through the demister 52 inside the absorption tower body 51 can be regulated with higher accuracy.

Furthermore, the internal regulating portions 8D as many as the number of the demisters 52 are disposed in the absorption tower body 51. Therefore, regardless of the number of the demisters 52 in the absorption tower body 51, the flow velocity of the exhaust gas passing through the demister 52 inside the absorption tower body 51 can be regulated with higher accuracy.

In addition, the internal regulating portion 8D is disposed in contact with the demister 52. Therefore, regardless of the disposition state of the demister 52 in the absorption tower body 51, the flow velocity of the exhaust gas passing through the demister 52 inside the absorption tower body 51 can be regulated with higher accuracy.

First Modification Example

Figure 7:
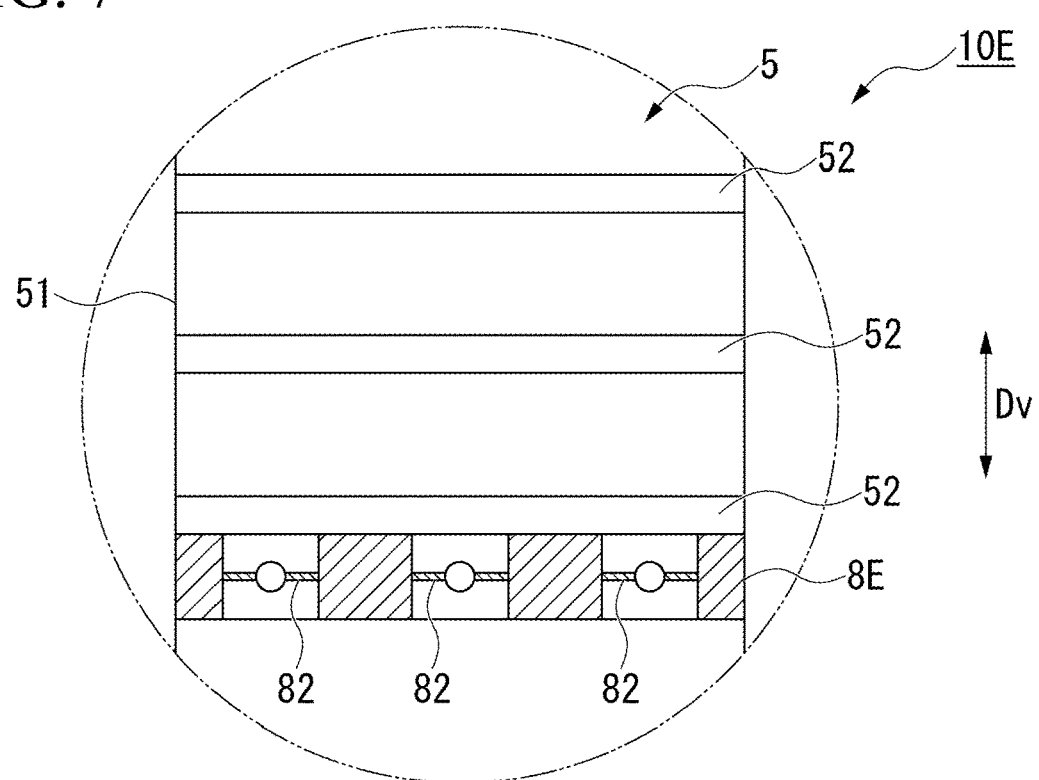
FIG. 7 is a schematic view showing a structure around a demister according to a first modification example of the fifth embodiment.

Next, a $CO_2$ recovery device 10E according to a first modification example of the fifth embodiment according to the present disclosure will be described. In the first modification example to be described below, the same configurations as those in the fifth embodiment are denoted by the same reference numerals in the drawing, and descriptions thereof will be omitted. As shown in FIG. 7, in the $CO_2$ recovery device 10E according to the first modification example, the disposition of an internal regulating portion 8E is different. The internal regulating portions are not limited to being disposed in the same number as the plurality of demisters 52 in a one-to-one relationship as in the fifth embodiment. For example, only one internal regulating portion 8E according to the first modification example may be disposed at a position upstream of the plurality of demisters 52 in the flow direction of the exhaust gas. That is, only one internal regulating portion 8E may be disposed at a position below the demister 52 disposed on the uppermost stream side (lowermost layer) in the vertical direction Dv. Even in such a case, the internal regulating portion 8E is preferably disposed in contact with the demister 52 on the uppermost stream side. That is, the internal regulating portion 8E is disposed to close the inlet of the demister 52 on the uppermost stream side. In addition, the internal regulating portion 8E has the same structure as the internal regulating portion 8D according to the fifth embodiment.

In such a $CO_2$ recovery device 10E according to the first modification example, the internal regulating portion 8E is disposed at a position upstream of the plurality of demisters 52 in the flow direction of the exhaust gas. Therefore, the flow velocity of the exhaust gas immediately before passing through the plurality of demisters 52 inside the absorption tower body 51 can be regulated by the internal regulating portion 8E. As a result, the flow velocity of the exhaust gas flowing through the plurality of demisters 52 inside the absorption tower body 51 can be regulated by a small number of the internal regulating portions 8E.

Second Modification Example

Figure 8:
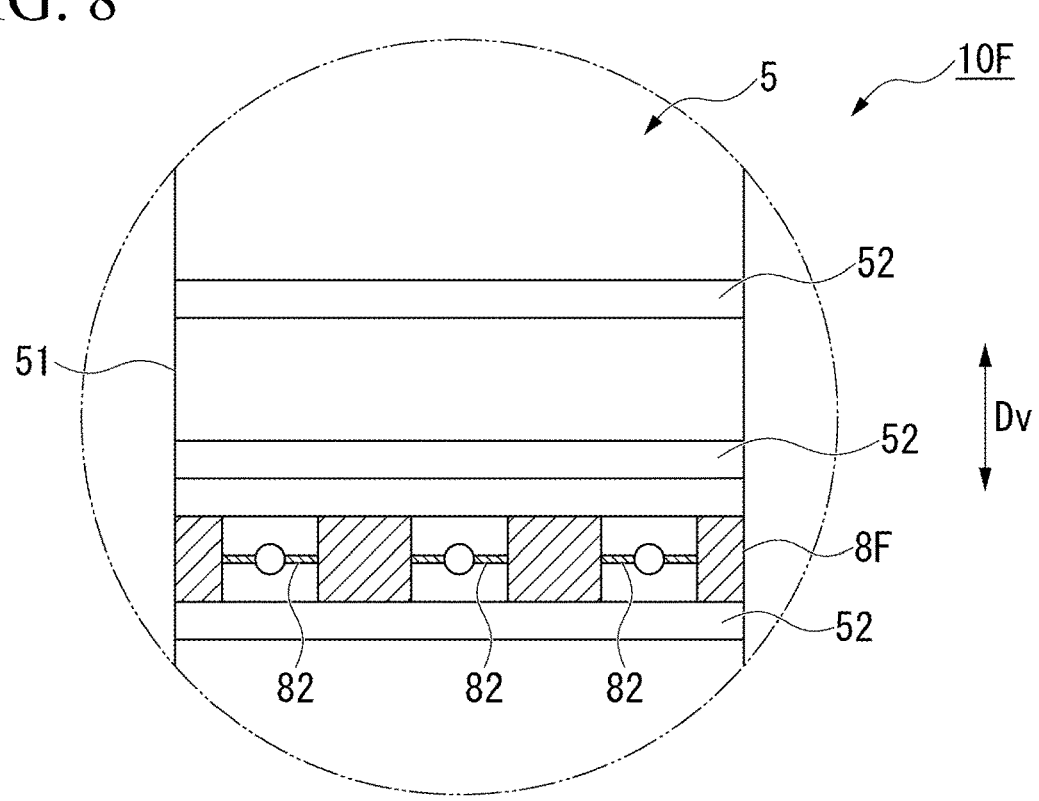
FIG. 8 is a schematic view showing a structure around a demister according to a second modification example of the fifth embodiment.
Figure 9:
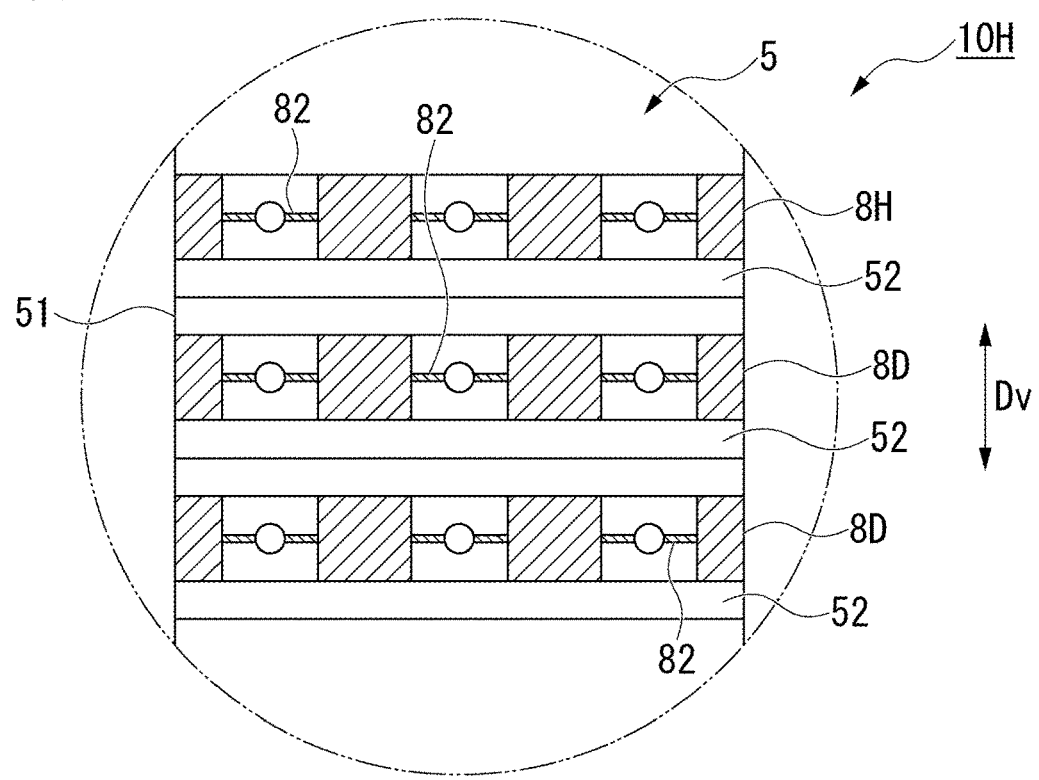
FIG. 9 is a schematic view showing a structure around a demister according to a third modification example of the fifth embodiment.

Next, a $CO_2$ recovery device 10F according to a second modification example of the fifth embodiment according to the present disclosure will be described. In the second modification example to be described below, the same configurations as those in the fifth embodiment are denoted
by the same reference numerals in the drawing, and descrip-
tions thereof will be omitted. As shown in FIG. 8, in the CO₂
recovery device 10E according to the second modification
example, the disposition of an internal regulating portion 8F
is different. The internal regulating portion 8F according to
the second modification example is not limited to being
disposed at a position upstream of the demister 52 in the
flow direction of the exhaust gas as in the fifth embodiment.
For example, only one internal regulating portion 8F may be
disposed at a position downstream of the demister 52 in the
flow direction of the exhaust gas. More specifically, only one
internal regulating portion 8F may be disposed at a position
above the demister 52 disposed on the uppermost stream
side (lowermost layer) in the vertical direction Dv. Even in
such a case, the internal regulating portion 8F is preferably
disposed in contact with the demister 52 on the uppermost
stream side. That is, the internal regulating portion 8F is
disposed to close the outlet of the demister 52 on the
uppermost stream side. In addition, the internal regulating
portion 8F has the same structure as the internal regulating
portion 8D according to the fifth embodiment.

In such a CO₂ recovery device 10F according to the
second modification example, the internal regulating portion
8F is disposed in contact with a position downstream of the
demister 52 disposed on the uppermost stream side (lower-
most layer) in the flow direction of the exhaust gas. Even in
the configuration of the second modification example, the
flow velocity of the exhaust gas flowing through the plural-
ity of demisters 52 inside the absorption tower body 51 can
be regulated in the same manner as in the first modification
example.

Third Modification Example

Next, a CO₂ recovery device 10H according to a third
modification example of the fifth embodiment according to
the present disclosure will be described. In the third modi-
fication example to be described below, the same configu-
rations as those in the fifth embodiment are denoted by the
same reference numerals in the drawing, and descriptions
thereof will be omitted. The internal regulating portion 8F
according to the third modification example is not limited to
the configuration in which only one internal regulating
portion is disposed at a position downstream of the plurality
of demisters 52 in the flow direction of the exhaust gas as in
the second modification example. For example, as in the
fifth embodiment, the internal regulating portions 8F as
many as the number of the plurality of demisters 52 may be
disposed at positions downstream of the demisters 52 in the
flow direction of the exhaust gas in a one-to-one relation-
ship. For example, a plurality of the internal regulating
portions 8F may be disposed at positions downstream of the
plurality of demisters 52 in the flow direction of the exhaust
gas in a one-to-one relationship. Even in such a case, the
plurality of internal regulating portions 8F are preferably
disposed in contact with the plurality of demisters 52,
respectively. That is, the plurality of internal regulating
portions 8F are disposed to close the outlets of the plurality
of demisters 52. In addition, the internal regulating portion
8F has the same structure as the internal regulating portion
8D according to the fifth embodiment.

Even in the CO₂ recovery device 10F according to the
third modification example, the internal regulating portions
8F are respectively disposed adjacent to positions down-
stream of the plurality of demisters 52 in the flow direction
of the exhaust gas. Even in the configuration of the third modification example, the flow velocity of the exhaust gas
flowing through the plurality of demisters 52 inside the
absorption tower body 51 can be regulated in the same
manner as in the fifth embodiment.

Another Embodiment

The embodiments of the present disclosure have been
described above in detail with reference to the drawings.
However, the specific configurations are not limited to the
embodiments, and include a design modification or the like
within a scope which does not depart from the gist of the
present disclosure.

For example, each of the above-described embodiments
may be combined with other embodiments. Specifically, the
first embodiment and the second embodiment may be com-
bined, or the third embodiment and the fourth embodiment
may be combined. In addition, the fifth embodiment or the
modification example thereof may be combined with any of
the first to fourth embodiments.

In addition, the additional supply line 62, 62B is not
limited to the structure in which only one of the exhaust gas
from which carbon dioxide has been removed and the air is
supplied. The additional supply line 62, 62B may have a
structure capable of simultaneously supplying the exhaust
gas from which carbon dioxide has been removed and the
air, or a structure capable of selectively supplying the
exhaust gas from which carbon dioxide has been removed
and the air. In addition, the additional supply line 62, 62B
may have a structure capable of supplying a fluid (gas) other
than the exhaust gas from which carbon dioxide has been
removed and the air.

In addition, the additional supply line 62, 62B is not
limited to being connected to the cooling line 3 between the
cooling tower 2 and the blower 4 as long as the exhaust gas
before being supplied to the absorption tower body 5 can be
supplied with the fluid. For example, the additional supply
line 62, 62B may be connected to the cooling line 3 between
the blower 4 and the absorption tower 5. In addition, the
additional supply line 62, 62B may be connected to the
supply line 1.
<Appendix>

The CO₂ recovery devices 10, 10A, 10B, 10C, 10D, 10E,
10F, and 10H described in the embodiments are grasped as
follows, for example.

(1) A CO₂ recovery device 10, 10A, 10B, 10C, 10D, 10E,
10F, 10H according to a first aspect includes: a cooling tower
2 into which an exhaust gas containing carbon dioxide is
introduced to cool the exhaust gas; and an absorption tower
5 into which the exhaust gas cooled in the cooling tower 2
is introduced and which brings the exhaust gas into contact
with an absorption liquid to remove the carbon dioxide from
the exhaust gas, in which the absorption tower 5 has an
absorption tower body 51 through which the exhaust gas
flows and which has a tubular shape, and a demister 52 that
is disposed inside the absorption tower body 51 and is
configured to remove mist contained in the exhaust gas as
the exhaust gas flows therethrough, and the CO₂ recovery
device further includes a flow velocity regulating section 6,
6A, 6B, 6C, 6D that is configured to regulate the flow
velocity of a fluid flowing through the demister 52 to be
within a predetermined range.

With such a configuration, the flow velocity of the exhaust
gas flowing through the demister 52 is maintained at a nearly
constant value. In this way, even when the flow rate of the
supplied exhaust gas decreases, the demister 52 can continue
to be supplied with the fluid with a constant flow velocity.

Therefore, a decrease in the flow rate of the fluid supplied to the demister 52 can be suppressed.

(2) A $CO_2$ recovery device 10, 10A, 10B, 10C, 10D, 10E, 10F, 10H according to a second aspect provides the $CO_2$ recovery device 10, 10A, 10B, 10C, 10D, 10E, 10F, 10H according to (1), in which the flow velocity regulating section 6, 6B has a differential pressure acquisition unit 61 that acquires information on a differential pressure between the pressure of the exhaust gas before being supplied to the demister 52 inside the absorption tower 5 and the pressure of the exhaust gas after passing through the demister 52 inside the absorption tower 5, an additional supply line 62, 62B configured to supply a fluid to the exhaust gas before being supplied to the absorption tower body 5, a flow rate regulating valve 63 configured to regulate a supply amount of the fluid through the additional supply line 62, 62B, and a control unit 7 configured to control an opening of the flow rate regulating valve 63, and the control unit 7 controls to increase the opening of the flow rate regulating valve 63 in a case in which the differential pressure acquired by the differential pressure acquisition unit 61 is below a specified differential pressure value determined in advance.

With such a configuration, in a case in which the differential pressure inside the absorption tower body 51 is below the specified differential pressure value, the control unit 7 controls the opening of the flow rate regulating valve 63 to widen the opening. Therefore, the fluid sent to the additional supply line 62, 62B is sent to the cooling line 3 through the flow rate regulating valve 63. That is, not only the exhaust gas before removing the carbon dioxide, which has been sent from the cooling tower 2 but also the fluid from the additional supply line 62, 62B is additionally supplied to the cooling line 3. As a result, the flow rate of the fluid supplied to the absorption tower 5 is increased. As the flow rate of the fluid supplied to the absorption tower 5 is increased, the flow velocity of the fluid flowing through the demister 52 inside the absorption tower body 51 is increased. As a result, the flow velocity of the fluid flowing through the demister 52 inside the absorption tower body 51 is maintained at a nearly constant value. In this way, even when the flow rate of the supplied exhaust gas decreases, the decrease in the supply amount of the fluid to the demister 52 can be quickly grasped by using the information on the differential pressure around the demister 52 inside the absorption tower body 51, and the demister 52 can continue to be supplied with the fluid with a constant flow velocity. Therefore, a decrease in the flow rate of the fluid supplied to the demister 52 can be suppressed.

(3) A $CO_2$ recovery device 10, 10A, 10B, 10C, 10D, 10E, 10F, 10H according to a third aspect provides the $CO_2$ recovery device 10, 10A, 10B, 10C, 10D, 10E, 10F, 10H according to (1) or (2), in which the flow velocity regulating section 6A, 6C has a pressure acquisition unit 65 that configured to acquire information on the pressure of the exhaust gas before being supplied to the cooling tower 2, an additional supply line 62, 62B configured to supply a fluid to the exhaust gas before being supplied to the absorption tower body 5, a flow rate regulating valve 63 configured to regulate the flow rate of the fluid in the additional supply line 62, 62B, and a control unit 7A configured to control an opening of the flow rate regulating valve 63, and the control unit 7A controls to increase the opening of the flow rate regulating valve 63 in a case in which the pressure acquired by the pressure acquisition unit 65 is below a specified pressure value determined in advance.

With such a configuration, in a case in which the pressure of the exhaust gas before being supplied to the cooling tower 2 is below the specified pressure value, the control unit 7A controls the opening of the flow rate regulating valve 63 to widen the opening. Therefore, the exhaust gas sent to the additional supply line 62, 62B is sent again to the cooling line 3 through the flow rate regulating valve 63. That is, not only the exhaust gas before removing the carbon dioxide, which has been sent from the cooling tower 2 but also the fluid from the additional supply line 62, 62B is additionally supplied to the cooling line 3. As a result, the flow rate of the fluid supplied to the absorption tower 5 is increased. As the flow rate of the fluid supplied to the absorption tower 5 is increased, the flow velocity of the fluid flowing through the demister 52 inside the absorption tower body 51 is increased. As a result, the flow velocity of the fluid flowing through the demister 52 inside the absorption tower body 51 is maintained at a nearly constant value. In this way, even when the flow rate of the supplied exhaust gas decreases, the decrease in the supply amount of the fluid to the demister 52 can be quickly grasped by using the information on the pressure of the exhaust gas before being supplied to the cooling tower 2, and the demister 52 can continue to be supplied with the fluid with a constant flow velocity. Therefore, a decrease in the flow rate of the fluid supplied to the demister 52 can be suppressed.

(4) A $CO_2$ recovery device 10, 10A, 10B, 10C, 10D, 10E, 10F, 10H according to a fourth aspect provides the $CO_2$ recovery device 10, 10A, 10B, 10C, 10D, 10E, 10F, 10H according to (3), which further includes: a flow velocity increasing section configured to increase the flow velocity of the exhaust gas cooled in the cooling tower 2 and supplies the exhaust gas having the increased flow velocity to the absorption tower 5, in which the flow velocity regulating section 6A, 6C further has a flow rate acquisition unit 66 configured to acquire information on the flow rate of the exhaust gas before being supplied to the flow velocity increasing section after being cooled in the cooling tower 2, and the control unit 7A controls to increase the flow rate in the flow velocity increasing section in a case in which the flow rate acquired by the flow rate acquisition unit 66 is below a specified flow rate value determined in advance.

With such a configuration, not only the information on the pressure of the exhaust gas before being supplied to the cooling tower 2 but also the information on the flow rate of the exhaust gas before being supplied to the flow velocity increasing section is used. Therefore, a decrease in the supply amount of the exhaust gas to the demister 52 can be quickly grasped with higher accuracy.

(5) A $CO_2$ recovery device 10, 10A, 10B, 10C, 10D, 10E, 10F, 10H according to a fifth aspect provides the $CO_2$ recovery device 10, 10A, 10B, 10C, 10D, 10E, 10F, 10H according to any one of (1) to (4), in which the additional supply line 62 supplies the exhaust gas from which the carbon dioxide has been removed in the absorption tower 5, as the fluid.

With such a configuration, the exhaust gas from which the carbon dioxide has been removed is circulated by the additional supply line 62, whereby it is possible to reuse the exhaust gas to increase the flow rate of the fluid supplied to the absorption tower 5 without preparing a new fluid separately. In addition, the exhaust gas from which the carbon dioxide has been removed in the absorption tower 5 is supplied through the additional supply line 62, whereby it is possible to suppress a supply of a cold fluid to the cooling line 3 as compared with a case in which air in the atmosphere is supplied to the cooling line 3. In addition, when a cold fluid is supplied, such as when a temperature of the atmosphere is low, it is necessary to separately prepare a heater and regulate the temperature before supplying the cold fluid to the cooling line 3. However, the temperature regulation can be made unnecessary by sending the exhaust gas again through the additional supply line 62. Furthermore, the oxygen contained in the exhaust gas is less than the oxygen contained in the air. Therefore, an increase in a content of the oxygen in the fluid supplied to the absorption tower 5 can be suppressed. As a result, it is possible to suppress the oxidative deterioration of the absorption liquid that comes into contact with the exhaust gas as a fluid in the absorption tower 5.

(6) A $CO_2$ recovery device 10, 10A, 10B, 10C, 10D, 10E, 10F, 10H according to a sixth aspect provides the $CO_2$ recovery device 10, 10A, 10B, 10C, 10D, 10E, 10F, 10H according to any one of (1) to (5), in which the additional supply line 62B supplies outside air as the fluid.

With such as configuration, by supplying the air from the additional supply line 62B, it is not necessary to connect the additional supply line 62B from the exhaust line 9 to the cooling line 3. That is, it is not necessary to lead an exhaust gas duct from an outlet of the absorption tower 5, and the facility of the $CO_2$ recovery device 10, 10A, 10B, 10C, 10D, 10E, 10F, 10H can be simplified.

(7) A $CO_2$ recovery device 10, 10A, 10B, 10C, 10D, 10E, 10F, 10H according to a seventh aspect provides the $CO_2$ recovery device 10, 10A, 10B, 10C, 10D, 10E, 10F, 10H according to any one of (1) to (6), in which the flow velocity regulating section 6, 6A, 6B, 6C, 6D has an internal regulating portion 8D, 8E, 8F, 8H that is disposed inside the absorption tower body 51 and is configured to regulate the flow rate of the fluid supplied to the demister 52 such that the flow rate falls within a predetermined reference range.

With such a configuration, even when the flow rate of the exhaust gas supplied to the absorption tower 5 decreases, the flow velocity of the fluid when passing through the demister 52 inside the absorption tower body 51 is directly regulated. As a result, the flow velocity of the fluid flowing through the demister 52 inside the absorption tower body 51 is maintained at a nearly constant value. In this way, even when the flow rate of the supplied exhaust gas decreases, the demister 52 can continue to be supplied with the fluid with a constant flow velocity by the internal regulating portion 8D, 8E, 8F, 8H. Therefore, a decrease in the flow rate of the fluid supplied to the demister 52 can be suppressed.

(8) A $CO_2$ recovery device 10, 10A, 10B, 10C, 10D, 10E, 10F, 10H according to an eighth aspect provides the $CO_2$ recovery device 10, 10A, 10B, 10C, 10D, 10E, 10F, 10H according to (7), in which the internal regulating portion 8D, 8E, 8F, 8H is disposed in contact with the demister 52.

With such a configuration, regardless of the disposition state of the demister 52 in the absorption tower body 51, the flow velocity of the fluid passing through the demister 52 inside the absorption tower body 51 can be regulated with higher accuracy.

REFERENCE SIGNS LIST

10, 10A, 10B, 10C, 10D, 10E, 10F, 10H: $CO_2$ recovery device
1: Supply line
2: Cooling tower
3: Cooling line
4: Blower
5: Absorption tower
51: Absorption tower body
52: Demister
6, 6A, 6B, 6C, 6D: Flow velocity regulating section

20

61: Differential pressure acquisition unit
62, 62B: Additional supply line
63: Flow rate regulating valve
7, 7A: Control unit
71, 71A: Input unit
72: Differential pressure determination unit
73, 73A: Supply amount regulating unit
65: Pressure acquisition unit
66: Flow rate acquisition unit
74: Pressure determination unit
75: Flow rate determination unit
76: Blower regulating unit
8D, 8E, 8F, 8H: Internal regulating portion
82: Blade
9: Exhaust line
20: Exhaust gas generation source
30: Smokestack
Dv: Vertical direction

What is claimed is:
1. A $CO_2$ recovery device comprising:
a cooling tower into which an exhaust gas containing carbon dioxide is introduced to cool the exhaust gas; and
an absorption tower into which the exhaust gas cooled in the cooling tower is introduced and which brings the exhaust gas into contact with an absorption liquid to remove the carbon dioxide from the exhaust gas, wherein
the absorption tower comprises:
an absorption tower body through which the exhaust gas is flowable and which has a tubular shape; and
a demister that is disposed inside the absorption tower body and is configured to remove mist contained in the exhaust gas as the exhaust gas flows therethrough,
the $CO_2$ recovery device further comprises a flow velocity regulating section that is configured to regulate a flow velocity of the exhaust gas flowing through the demister to be within a predetermined range, and
the flow velocity regulating section comprises:
a differential pressure acquisition unit that acquires information on a differential pressure between a position upstream of the demister and a position downstream of the demister in a flow direction of the exhaust gas in the absorption tower; and
a control unit configured to control the differential pressure acquired by the differential pressure acquisition unit by controlling the flow velocity such that:
the differential pressure is increased in response to decrease of the differential pressure, and
the differential pressure is decreased in response to increase of the differential pressure.
2. The $CO_2$ recovery device according to claim 1, wherein the flow velocity regulating section further includes:
an additional supply line configured to supply a fluid to the exhaust gas before being supplied to the absorption tower body, and
a flow rate regulating valve configured to regulate a supply amount of the fluid through the additional supply line,
the differential pressure acquired by the differential pressure acquisition unit is a differential pressure between a pressure of the exhaust gas before being supplied to the demister inside the absorption tower and a pressure of the exhaust gas after passing through the demister inside the absorption tower, and the control unit controls an opening of the flow rate regulating valve and controls to increase the opening of the flow rate regulating valve in a case in which the differential pressure acquired by the differential pressure acquisition unit is below a specified differential pressure value determined in advance.

3. The $CO_2$ recovery device according to claim 2, wherein the additional supply line supplies the exhaust gas from which the carbon dioxide has been removed in the absorption tower, as the fluid.

4. The $CO_2$ recovery device according to claim 2, wherein the additional supply line supplies outside air as the fluid.

5. The $CO_2$ recovery device according to claim 1, wherein the flow velocity regulating section has an internal regulating portion that is disposed inside the absorption tower body and is configured to regulate a flow rate of the exhaust gas supplied to the demister such that the flow rate falls within a predetermined reference range.

6. The $CO_2$ recovery device according to claim 5, wherein the internal regulating portion is disposed in contact with the demister.

* * * * *